United States Patent
Reedy

(10) Patent No.: US 6,473,189 B1
(45) Date of Patent: Oct. 29, 2002

(54) APPARATUS AND METHOD FOR DETERMINING A DISTANCE TO A REFLECTIVE SURFACE

(75) Inventor: John T. Reedy, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/370,711

(22) Filed: Aug. 9, 1999

(51) Int. Cl.[7] .............................................. G01B 11/14
(52) U.S. Cl. ................. 356/623; 356/3.11; 250/559.31; 250/559.38
(58) Field of Search ................................ 356/3.1, 3.11, 356/3.12, 623; 250/559.23, 559.31, 559.38

(56) References Cited

U.S. PATENT DOCUMENTS

| | | | |
|---|---|---|---|
| 4,110,611 A | 8/1978 | Tann et al. ............. 250/237 R |
| 4,150,299 A | 4/1979 | Kasiewicz et al. .......... 250/561 |
| 4,656,881 A | 4/1987 | Goedecke et al. ............ 74/110 |
| 4,736,674 A | 4/1988 | Stoll ............................. 92/5 R |
| 4,806,707 A | 2/1989 | Landmeier .................... 178/18 |
| 4,819,546 A | 4/1989 | Ernst et al. .................... 92/5 R |
| 4,860,639 A | 8/1989 | Sakaguchi ..................... 92/5 R |
| 4,898,079 A | 2/1990 | Combette ..................... 92/5 R |
| 4,899,643 A | 2/1990 | Hvilsted et al. ............... 92/5 R |
| 4,902,903 A | 2/1990 | Segerson et al. ........... 250/561 |
| 4,936,143 A | 6/1990 | Schutten et al. .............. 73/597 |
| 5,052,273 A | 10/1991 | Sakaguchi .................... 92/5 R |
| 5,371,598 A | 12/1994 | Ghaem et al. ............... 356/373 |
| 5,424,530 A | 6/1995 | Mizuno ................... 250/214 R |
| 5,554,858 A | 9/1996 | Costa et al. ............ 250/559.29 |
| 5,644,385 A | 7/1997 | Mizuno ...................... 356/3.04 |
| 5,648,657 A | 7/1997 | Sundararajan ............ 250/231.1 |
| 5,816,778 A | 10/1998 | Elsey, Jr. et al. .............. 417/46 |
| 5,933,240 A | * 8/1999 | Jurca ......................... 356/3.11 |

FOREIGN PATENT DOCUMENTS

JP 58-8806 1/1983 ........... F15B/15/20

* cited by examiner

Primary Examiner—F. L. Evans
(74) Attorney, Agent, or Firm—Clifton G Green

(57) ABSTRACT

An apparatus for measuring the distance to a reflective surface. A first light source transmits a first light onto the reflective surface, the first light source being located on a first side of an axis. The reflective surface reflects at least a portion of the light onto a first light-detecting device having a first region operable to receive the reflected first light from the reflective surface. The first light-detecting device transmits a first and second signals as a function of the location of the received first light within the first region. A second light source transmits a second light onto the reflective surface, the second light source being located on a second side of the axis. The reflective surface reflects at least a portion of the second light onto a second light-detecting device having a second region operable to receive the reflected second light from the reflective surface. The second light-detecting device transmits a third and fourth signals as a function of the location of the received light within the second region. A processing device is coupled with the first and second light-detecting devices to respectively receive the first, second, third, and fourth signals. The processing device transmits a position signal indicative of the distance to the reflected surface as a function of the first, second, third, and fourth signals.

9 Claims, 4 Drawing Sheets

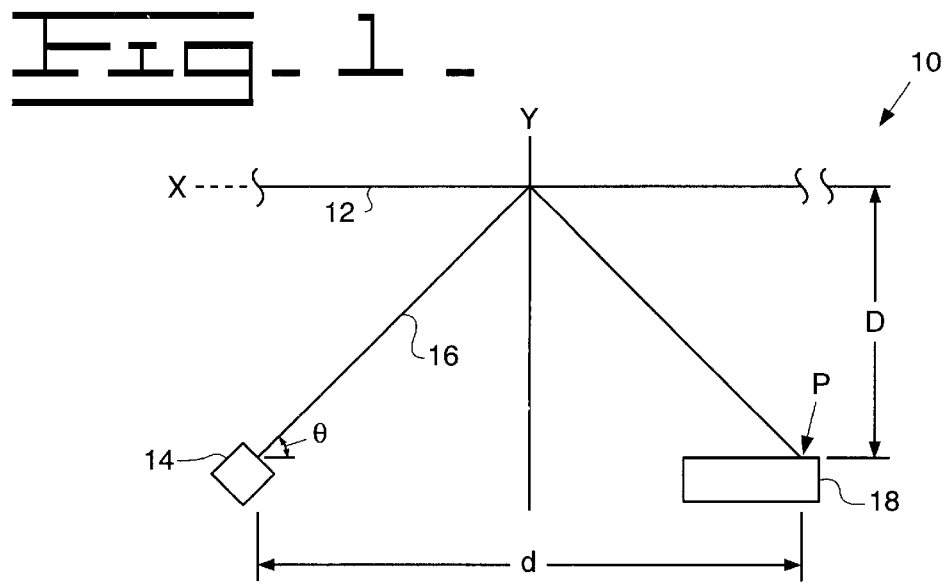
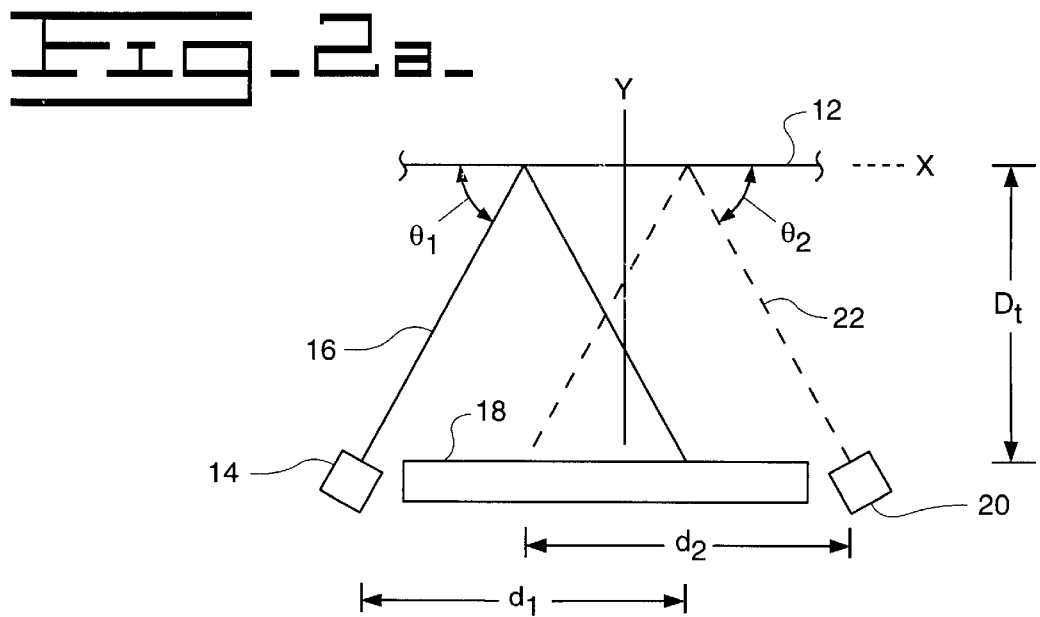
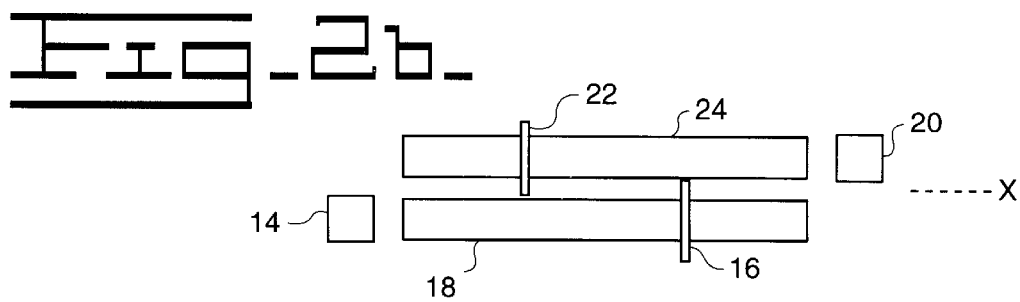

Fig_3a_
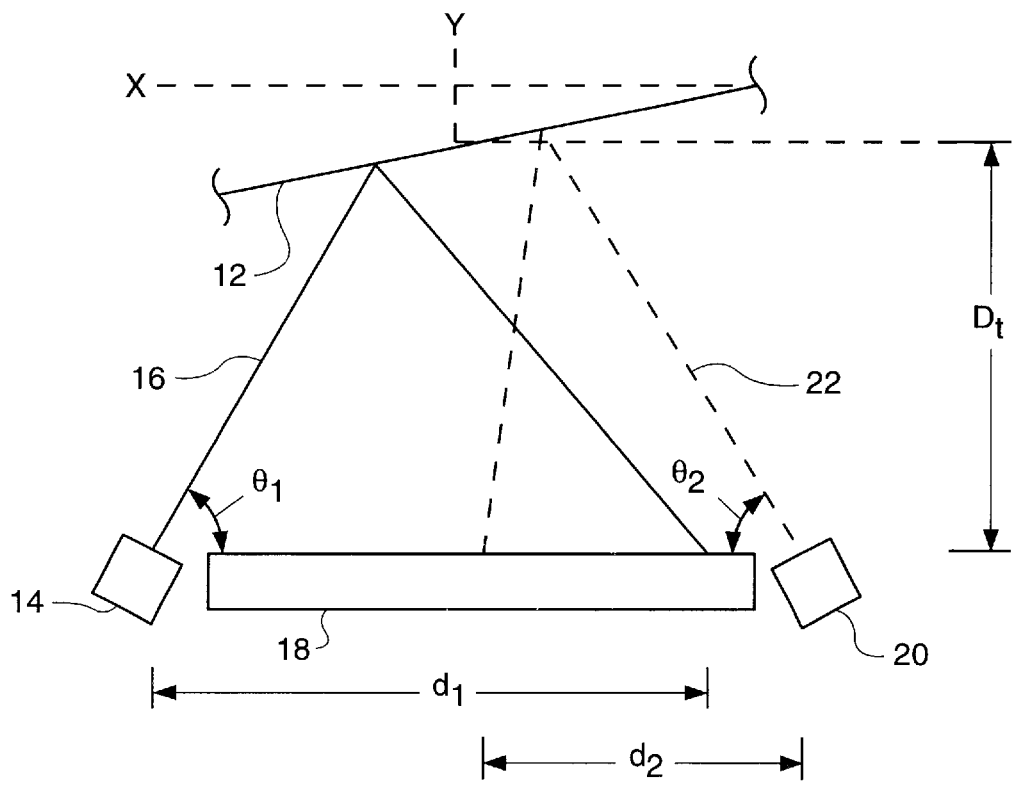
Fig_3b_
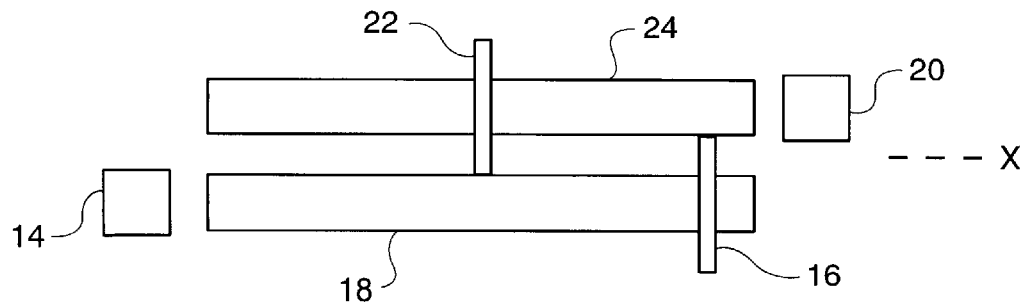

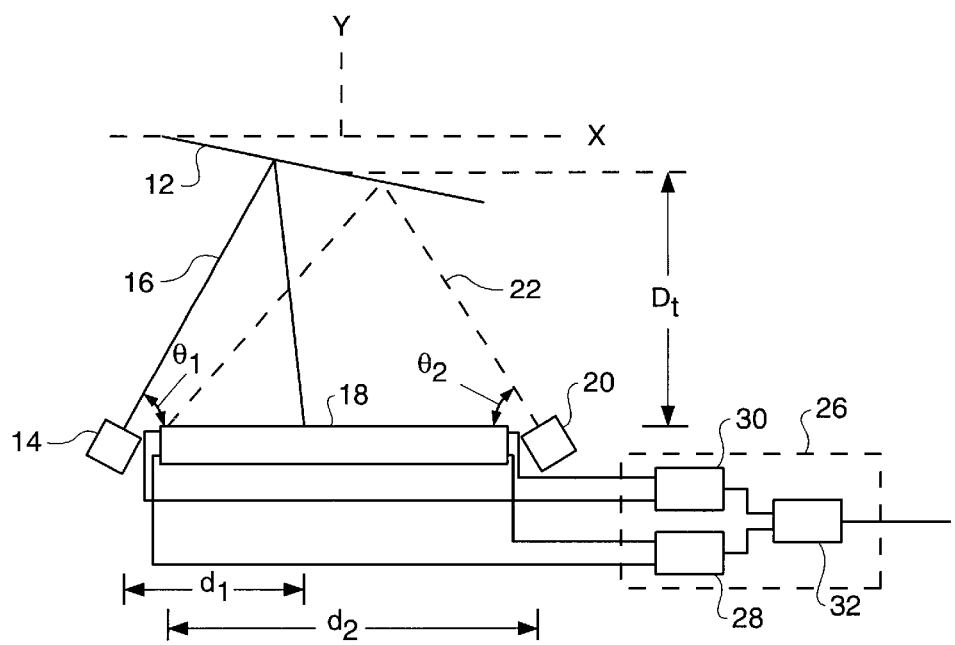
Fig_4a_
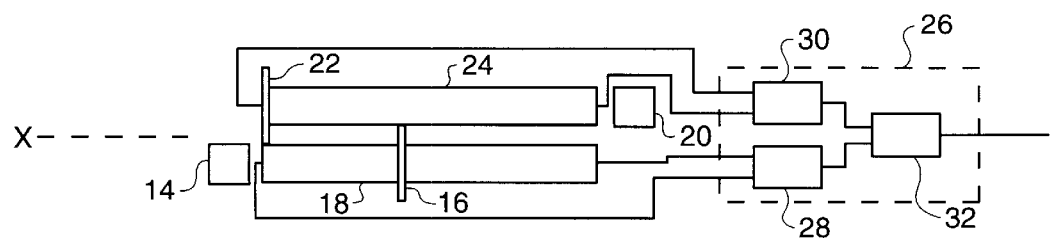
Fig_4b_

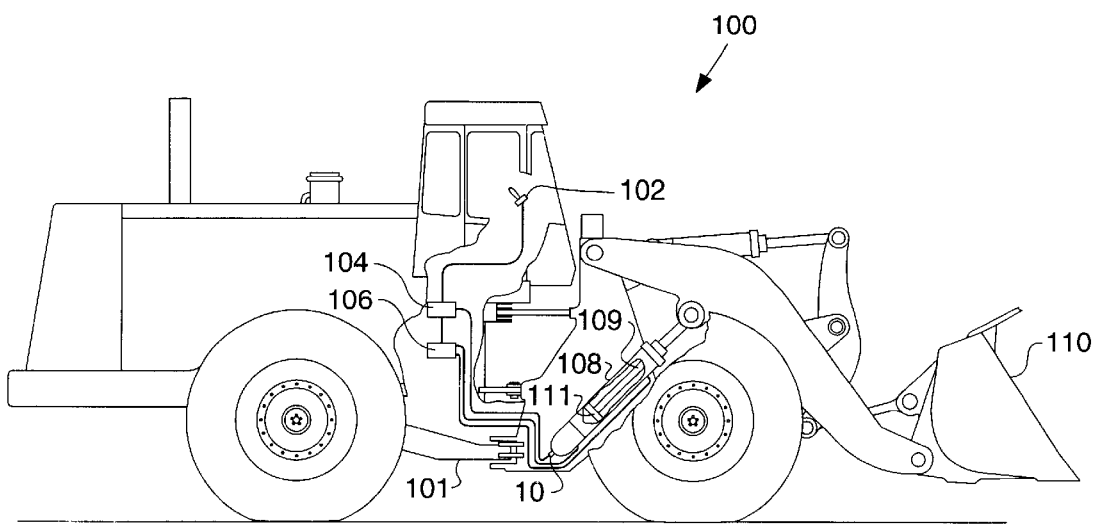
Fig_5_

US 6,473,189 B1

APPARATUS AND METHOD FOR DETERMINING A DISTANCE TO A REFLECTIVE SURFACE

TECHNICAL FIELD

The present invention relates generally to the determining of distances to a reflective surface, and more specifically, to an apparatus and method for determining the extension of a cylinder rod within a cylinder.

BACKGROUND ART

Many work machines use hydraulic cylinders for a variety of tasks. Some work machines use them to control the movement and position of a work implement, while other work machines use them to control articulation between sections of the work machine, such as in an articulated truck.

It is frequently helpful to know the precise location of the work implement, or the degree of articulation of the truck, for example. Many work machines use a variety of conventional types of cylinder position sensors to provide this information to an operator, or to an automatic control system to allow for closed loop control of the hydraulic cylinder. One such type of sensor system uses light reflected off one end of a cylinder cavity to determine the position of the cylinder rod. These conventional sensor systems, however, work best when the surface that the light is reflecting off of is perpendicular to the longitudinal axis of the cylinder. This is not always the situation in real world applications.

Many hydraulic cylinders on work machines exert and experience tremendous loads during normal operation. These loads may distort the hydraulic cylinder, such as causing a tilt to the cylinder rod so that it is no longer perpendicular to the longitudinal axis of the cylinder. In these instances, the tilt causes the light to reflect at an unexpected angle, causing error in the determination of the precise amount of extension of the cylinder rod.

DISCLOSURE OF THE INVENTION

The present invention provides a method and apparatus for measuring the distance to a reflective surface. A first light source transmits a first light onto the reflective surface, the first light source being located on a first side of an axis. The reflective surface reflects at least a portion of the light onto a first light-detecting device having a first region operable to receive the reflected first light from the reflective surface. The first light-detecting device transmits a first and second signals as a function of the location of the received first light within the first region. A second light source transmits a second light onto the reflective surface, the second light source being located on a second side of the axis. The reflective surface reflects at least a portion of the second light onto a second light-detecting device having a second region operable to receive the reflected second light from the reflective surface. The second light-detecting device transmits a third and fourth signals as a function of the location of the received light within the second region. A processing device is coupled with the first and second light-detecting devices to respectively receive the first, second, third, and fourth signals. The processing device transmits a position signal indicative of the distance to the reflected surface as a function of the first, second, third, and fourth signals.

BRIEF DESCRIPTION OF THE DRAWINGS

FIG. 1 is a side view of a portion of an apparatus for measuring a first distance according to one embodiment of the invention.

FIG. 2a is a side view of a portion of an apparatus for measuring a distance to a perpendicular surface according to one embodiment of the invention.

FIG. 2b is a top view of a portion of the apparatus of FIG. 2a.

FIG. 3a is a side view of a portion of an apparatus for measuring a distance to a tilted surface according to one embodiment of the invention.

FIG. 3b is a top view of a portion of the apparatus of FIG. 3a.

FIG. 4a is a side view of a portion of an apparatus for measuring a distance to another tilted surface according to one embodiment of the invention.

FIG. 4b is a top view of a portion of the apparatus of FIG. 4a.

FIG. 5 is a side view of a work machine according to one embodiment of the invention.

BEST MODE FOR CARRYING OUT THE INVENTION

FIG. 1 is a side view of a portion of an apparatus 10 for measuring a distance D to a reflective surface 12 according to one embodiment of the invention. A light source, such as a laser 14 or other device capable of producing collimated light transmits a beam of light, such as a laser beam 16, onto a reflective surface 12. The laser beam 16 is reflected off the reflective surface 12 and onto a light-detecting device, such as a first one-dimensional position-sensitive detector ("PSD") 18. Refraction and diffusion may also be used as long as a sufficient amount of light is transmitted onto the first PSD 18. For purposes of simplicity, the term "reflection" shall include any method for transmitting light onto the light-detecting device. Other light sources, including infrared light sources, known to those skilled in the art may also be used, provided light having a sufficient focus and magnitude is received by the first PSD 18. The reflective surface is operable to be moved between a first and second predetermined points (not shown) along a common axis ("Y"). Preferably, the light source transmits a rectangle of light, i.e., a line of light having a width and a length. This may be accomplished by any of a variety of appropriate ways known to those skilled in the art.

The first PSD 18 typically produces a first and second output signals (not shown) per dimension being measured (e.g., measuring a distance is one-dimensional, measuring a location of a point on a grid is two-dimensional, etc.) as a function of the location of the laser beam 16 on the first PSD 18 by ways known to those skilled in the art. Conversely, the location of the laser beam 16 with respect to the first PSD 18 may be determined by those skilled in the art using the first and second output signals.

With the laser 14 and the first PSD 18 a known distance from each other, and a known location of the laser beam 16 on the position sensitive device 18, simple addition may be used to calculate a first distance d between the source of the laser beam 16 and the location where the laser beam 16 strikes the first PSD 18. The distance d will equal the distance between the laser 14 and the edge of the first PSD 18, plus the distance from the edge of the first PSD 18 to the point of contact of the laser beam 16. Typically the laser 14 and PSD 18 are fixed within a frame or housing (not shown), and thus the distances and angles will be known.

A distance D to the reflective surface 12 may be determined using d and a known angle θ of the laser beam 16 incident to an axis X perpendicular to a direction of motion (the axis Y) of the reflective surface 12. One preferred formula for determining the distance D to the reflective surface 12 is:

$$D = d/2 \cos \theta$$

where D is the distance to the reflective surface 12, d is the distance between the laser 14 and the point of contact of the laser beam 16 with the first PSD 18, and θ is the angle of the laser beam 16 incident to the axis X. Thus, by measuring a point P at which the laser beam 16 contacts the first PSD 18, the distance D to the reflective surface 12 may be determined.

FIG. 2a is a side view of a portion of an apparatus 10 for measuring the distance D to the reflective surface 12 according to one embodiment of the invention. In FIG. 2a, the reflective surface 12 is perpendicular to the axis of motion Y, i.e., not tilted, although the reflective surface 12 need not be. In addition to the first laser 14 and the first PSD 18, a second laser 20 transmits a second laser beam 22 onto the reflective surface 12. The reflective surface 12 reflects the second laser beam 22 onto a second PSD 24 (not shown). The second laser 20 and second PSD 24 function similarly to the first laser 14 and first PSD 18. The second PSD 24 typically produces a third and a fourth output signals, similar to the first and second output signals, described above, and will not be repeated in the interest of brevity.

FIG. 2b is a top view of the portion of the apparatus 10 of FIG. 2a. Typically the second PSD 24 is located parallel and in close proximity to the first PSD 18, although other configurations, such as being in-line, are also possible. In one embodiment, the angle of incidence (from the X axis) for the first and second lasers 14, 20 is equal. Further, the first and second lasers 14, 20 preferably transmit the first and second laser beams 16, 22 from locations spaced approximately 180 degrees from each other with respect to the Y axis. Although the second laser 20 may be located elsewhere for measuring the distance to the reflective surface 12 when the reflective surface 12 is perpendicular to the Y axis, the 180 degree spacing provides advantages when the reflective surface 12 is not perpendicular, as described below.

In order for the apparatus 10 to measure the distance D, the laser beams 16, 22 should reflect off the reflective surface 12 and onto the PSD's 18, 24. Thus, the distance D which the apparatus 10 can measure is inherently limited by angles $\theta_1$, $\theta_2$ of the laser beams 16, 22, and the widths of the reflective surface 12 and the first and second PSD's 18, 24. These measurements may be selected appropriately to cover the operating range of movement by the reflective surface 12.

FIG. 3a is a side view of a portion of the apparatus 10 for measuring the distance D to a tilted surface according to one embodiment of the invention. The distance D is the same as shown in FIG. 2a. However, because of the tilt of the reflective surface 12, the locations on the PSD's 18, 24 where the laser beams 16, 22 strike are different than that from when the reflective surface 12 is not tilted (See FIG. 2a). For example, when the reflective surface 12 is tilted counterclockwise (as shown in FIG. 3a), the first laser beam 16 will strike the first PSD 18 further to the right than if the reflective surface 12 was not tilted. Similarly, the second laser beam 22 will also strike the second PSD 24 further to the right.

Because the distance D is dependent on the determined distance d, the first PSD 18 will output a signal or pair of signals indicating the distance D is greater than in actuality (the determined distance d will be greater). The second PSD 24 will output a signal or pair of signals indicating the distance D is less than actual (the determined distance d is less).

Significantly, in the embodiment shown, if the reflective surface 12 is tilted, i.e., rotated about a Z axis (coming out of the page), the amount of error of the determined positions $d_1$, $d_2$ will be of the same magnitude, but opposite direction, e.g., for a given degree of tilt, the first PSD 18 will determine the reflective surface 12 is two inches farther than in actuality, while the second PSD 24 will determine the reflective surface 12 is two inches closer than in actuality. Thus, by averaging the distances $d_1$, $d_2$, (before determining D), or by averaging the calculated distances $D_1$, $D_2$, (using the distances $d_1$, $d_2$), the true distance $D_t$ to the reflective surface 12 may be determined.

If the reflective surface 12 is tilted about a different axis (not shown), e.g., about the X axis, the laser beams 16, 22 will be translated in a direction perpendicular to the X axis. If the width of the laser beam 16, 22 is sufficiently wide, the laser beam 16, 22 will still strike the first and second PSD's 18, 24 at the same points shown in FIG. 2a. Thus, the determined distances $d_1$, $d_2$ will correspond to the true distance $D_t$ to the reflective surface 12. The amount of tilt by the reflective surface 12 about the X axis, if large enough, may be sufficient to cause the laser beams 16, 22 to be deflected off of the PSD's 18, 24.

If the reflective surface is tilted about an axis other than the X or Z axes, the tilt will contain a component of tilt about the X axis, and a component of tilt about the Z axis direction. The tilt components may then be compensated for individually, as described above.

Tilt around the Y axis, i.e., rotation of the reflective surface 12, and will typically not affect the location of the laser beams 16, 22 on the PSD's 18, 24. The dimensions of the reflective surface 12, however, should be sufficient to cause the laser beam 16, 22 to strike the reflective surface 12, even if the reflective surface 12 is rotated about the Y axis.

In one embodiment (not shown), the angle $\theta_1$ may be different than the angle $\theta_2$. In this embodiment, a given amount of tilt of the reflective surface 12 will displace the laser beams 16 a different magnitude along the first PSD 18 than the second laser beam 22 along the second PSD 24. The amount of displacement for each laser beam 16, 22 will be a function of the angle $\theta_1$, $\theta_2$, and thus the true distance $D_t$ may be determined by multiplying the distances $d_1$, $d_2$, or $D_1$, $D_2$ by an appropriate factor corresponding to the ratio of the angles $\theta_1$, $\theta_2$.

FIG. 3b is a top view and block diagram of the portion of the apparatus 10 of FIG. 3a. Again, typically the second PSD 24 is located parallel and in close proximity to the first PSD 18, although other configurations, such as being in-line, are also possible.

FIG. 4a is a side view of an apparatus 10 for measuring a distance to another tilted surface 12 according to one embodiment of the invention. The apparatus 10 functions similar to what is described above, and will not be repeated. Because the reflective surface 12 is tilted clockwise, the first PSD 18 will determine the distance $d_1$ is less than actuality, while the second PSD 24 will determine the distance $d_2$ is greater than actuality. Again, averaging the distances $d_1$, $d_2$ or distances $D_1$, $D_2$ as described above will result in the true distance $D_t$ of the reflective surface 12.

As mentioned above, PSD's typically output two signals for each dimension measured, which together may be used to determine the location of light on the PSD. This determination may be performed by external circuitry, such as a processor 26, or may be internal to the PSD packaging. The processor 26 typically contains a first portion 28 that determines the distance $d_1$ as a function of the first and second output signals from the first PSD 18, a second portion 30 that determines distance $d_2$ as a function of the third and fourth output signals from the second PSD 24, and a third portion 32 that determines D as a function of distances $d_1$ and $d_2$. The third portion 32 then transmits a position signal as a function of the determined distance D. Although each of the portions 28–32 is depicted as being within the processor 26, any of the first, second, and third portions 28–32 could be located elsewhere.

FIG. 4b is a top view and block diagram of the apparatus 10 of FIG. 4a. Again, typically the second PSD 24 is located parallel and in close proximity to the first PSD 18, although other configurations, such as being in-line, are also possible.

FIG. 5 is a side view of a work machine 100, such as a wheel loader, having an apparatus 10 according to one embodiment of the invention. Other types of work machines known to those skilled in the art, including stationary work machines, such as manufacturing machines, may also be used. The work machine 100 includes a frame 101 and a control input device, such as a joystick 102 coupled with the frame 101. The joystick 102 is capable of being manipulated by an operator (not shown)., and transmitting an output signal as a function of the manipulation. Typically the joystick 102 transmits a desired position signal indicative of the position of the stick.

A controller 104 is typically coupled with the joystick 102 to receive the desired position signal, and to transmit a pump command signal as a function of the desired position signal. The controller 104 typically also receives an actual position signal, as described below. The controller 104 compares the actual position signal with the desired position signal, and adjusts the pump command signal as appropriate to cause the actual position signal to track the desired position signal. This tracking may be a 1:1 ratio, or some other ratio or function, as appropriate.

A pump 106 is coupled with the controller 104 to receive the pump command signal. The pump 106 produces fluid flow as a function of the pump command signal. The direction of fluid flow may be either positive or negative, and typically of varying magnitudes. A sump or reservoir (not shown) is typically coupled with the pump 106 to provide and receive the necessary fluid to effectuate the appropriate fluid flow.

An actuator, such as a hydraulic cylinder 108, or more typically a pair of hydraulic cylinders 108, is coupled with the frame 101 and with the pump 106 to receive the fluid flow. The hydraulic cylinder 108 extends or retracts a cylinder rod 109 within the hydraulic cylinder 108 as a function of the fluid flow.

A work implement, such as a bucket 110 or blade (not shown) is coupled with the cylinder rod 109 of one of at least one of the hydraulic cylinders 108. Other types of work implements, such as drills, hitches, and a variety of tools known to those skilled in the art may also be used. The bucket 110 changes position as a function of the extension of the cylinder rod 109. Thus, the joystick 102 may control the position of the bucket 110. A face 111, or portion of the face, of the cylinder rod 109 is reflective, and comprises the reflective surface 12 as described above. The face 111 may be polished to be reflective, or a reflective piece (not shown) may be inserted or attached the face 111 of the cylinder rod 109.

The apparatus 10 for measuring the distance to a reflective surface is disposed at least in part within the hydraulic cylinder 108. The apparatus 10 functions similarly to what is described above, and will not be repeated. The apparatus 10 transmits the position signal, such as the actual position signal, to the controller 104.

It will be understood by those skilled in the art that the apparatus 10 should be used in an environment conducive to the transmission of light. Various environments, such as being within hydraulic fluid, may attenuate the intensity of the light striking the PSD's. This attenuation, in turn, may limit the operating range of the reflective surface 12 for which the distance D may be measured. Additional apparatuses 10 may be used to compensate for this loss of operating range. For example, if the apparatus 10 is limited to measuring distances of 24 inches or less due to the environment in which it is operating, and a 48 inch stroke for the reflective surface 12 is used, a second apparatus (not shown) could be located on the opposite side of the hydraulic cylinder from the first apparatus 10. Thus, each apparatus would measure ½ of the stroke.

In one embodiment, the PSD's 18, 24 are located on the surface to which the distance D is to be measured. The lasers 14, 20 transmit light onto the PSD's 18, 24 directly, without reflection from a reflective surface. The distance D is a function of the angle of the laser beams 16, 22 and the points at which the laser beams strike the PSD's, and may be calculated by ways known to those skilled in the art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for measuring a distance to a reflective surface when the reflective surface is located between a first and second predetermined positions along a common axis, the apparatus operable to measure the distance when the reflective surface is at an angle other than 0 degrees with respect to a plane normal to the common axis, comprising:

a first light source operable to transmit a first light onto the reflective surface, the reflective surface reflecting at least a portion of the light, the first light source located on a first side of the axis;

a first light-detecting device having a first region operable to receive the reflected first light from the reflective surface and to transmit a first and second signals as a function of the location of the received first light within the first region;

a second light source operable to transmit a second light onto the reflective surface, the reflective surface reflecting at least a portion of the second light, the second light source located on a second side of the axis;

a second light-detecting device having a second region operable to receive the reflected second light from the reflective surface and to transmit a third and fourth signals as a function of the location of the received light within the second region; and a processing device coupled with the first and second light-detecting devices to respectively receive the first, second, third, and fourth signals, the processing device operable to transmit a position signal indicative of the distance to the reflected surface as a function of the first, second, third, and fourth signals;

wherein the first and second light sources comprise light sources operable to transmit collimated light.

2. The apparatus of claim 1 wherein the first and second light sources are located approximately 180 degrees from each other with respect to the axis.

3. The apparatus of claim 1 wherein the first and second light-detecting devices comprise position sensitive light-detecting devices.

4. The apparatus of claim 1 wherein the first and second light sources comprise lasers.

5. The apparatus of claim 1 wherein the first and second light sources transmit light onto a first portion of the reflective surface.

6. An apparatus for measuring a distance to a reflective surface when the reflective surface is located between a first and second predetermined positions along a common axis, the apparatus operable to measure the distance when the reflective surface is at an angle other than 0 degrees with respect to a plane normal to the common axis, comprising:
- a first light source operable to transmit a first light onto the reflective surface, the reflective surface reflecting at least a portion of the light, the first light source located on a first side of the axis;
- a first light-detecting device having a first region operable to receive the reflected first light from the reflective surface and to transmit a first and second signals as a function of the location of the received first light within the first region;
- a second light source operable to transmit a second light onto the reflective surface, the reflective surface reflecting at least a portion of the second light, the second light source located on a second side of the axis;
- a second light-detecting device having a second region operable to receive the reflected second light from the reflective surface and to transmit a third and fourth signals as a function of the location of the received light within the second region; and
- a processing device coupled with the first and second light-detecting devices to respectively receive the first, second, third, and fourth signals, the processing device operable to transmit a position signal indicative of the distance to the reflected surface as a function of the first, second, third, and fourth signals;
- wherein the first and second light sources are each operable to produce a line of light having a width and a length.

7. An apparatus for measuring the extension of a cylinder rod within a cylinder between first and second predetermined positions along a common axis comprising:
- a cylinder rod within a cylinder, either of the cylinder rod or cylinder having a face and a reflective portion on at least a part of said face;
- a first laser operable to transmit a first laser beam onto the reflective portion of the face, the reflective portion reflecting at least a portion of the laser beam, the first laser located on a first side of the axis;
- a first position sensitive device having a first region operable to receive the reflected first laser beam from the reflective portion of the face and to transmit a first and second signals as a function of the location of the received first laser beam within the first region;
- a second laser operable to transmit a second laser beam onto the reflective portion of the face, the reflective portion reflecting at least a portion of the second laser, the second laser located on a second side of the axis;
- a second position sensitive device having a second region operable to receive the reflected second laser beam from the reflective portion of the face, and to transmit a third and fourth signals as a function of the location of the received laser beam within the second region; and
- a processing device coupled with the first and second position sensitive devices to respectively receive the first and second, and third and fourth signals, the processing device operable to transmit a position signal as a function of the first, second, third, and fourth signals.

8. A work machine, comprising:
- a frame;
- a control input device coupled with the frame and operable to transmit a desired position signal as a function of an input;
- a controller operable to receive an actual position signal, the controller coupled with the control input device to receive the desired position signal, the controller operable to transmit a pump command signal as a function of the desired position signal and the actual position signal;
- a hydraulic pump coupled with the controller to receive the pump command signal, the pump operable to produce a fluid flow as a function of the pump command signal;
- a hydraulic cylinder having a cylinder rod, the hydraulic cylinder coupled with the hydraulic pump to receive the fluid flow, the hydraulic cylinder operable to extend and retract the cylinder rod as a function of the fluid flow;
- a work tool coupled with the frame and with the hydraulic cylinder, the work tool operable to move from a first position to a second position as a function of the extension of the cylinder rod; and
- an apparatus for measuring the extension of the cylinder rod within the cylinder, the cylinder rod having a reflective portion on at least a part of a face of the cylinder rod, the apparatus operable to measure the extension when the face of the cylinder rod is located between a first and second predetermined positions along a common axis, the apparatus operable to measure the distance when the cylinder rod is at an angle other than 0 degrees with respect to a plane normal to the common axis, comprising:
  - a first light source operable to transmit a first light onto the reflective portion, the reflective portion reflecting at least a portion of the light, the first light source located on a first side of the axis;
  - a first light-detecting device having a first region operable to receive the reflected first light from the reflective portion and to transmit a first and second signals as a function of the location of the received first light within the first region;
  - a second light source operable to transmit a second light onto the reflective portion, the reflective portion reflecting at least a portion of the second light, the second light source located on a second side of the axis;
  - a second light-detecting device having a second region operable to receive the reflected second light from the reflective portion and to transmit a third and fourth signals as a function of the location of the received light within the second region; and
  - a processing device coupled with the first and second light-detecting devices to respectively receive the first and second, and third and fourth signals, the processing device operable to transmit an actual position signal indicative of the distance to the reflected surface as a function of the first, second, third, and fourth signals, the processing device operable to transmit the actual position signal to the controller.

9. A method for measuring a distance to a reflective surface when the reflective surface is located between a first and second predetermined positions along a common axis, the method operable to measure the distance when the reflective surface is at an angle other than 0 degrees with respect to a plane normal to the common axis, comprising:

transmitting a first light at a first angle onto the reflective surface from a first point on a first side of the axis;

reflecting the first light off the reflective surface;

receiving the reflected first light;

determining the location of the received first light;

transmitting a second light at a second angle onto the reflective surface from a second point on a second side of the axis;

reflecting the second light off the reflective surface;

receiving the reflected second light;

determining the location of the received second light;

determining a distance from the reflective surface as a function of the location of the received first and second reflected light, the distance between the first and second points, and the first and second angles; and wherein the light comprises collimated light.

* * * * *